(12) United States Patent
Akaguma

(10) Patent No.: US 9,900,493 B2
(45) Date of Patent: Feb. 20, 2018

(54) FOCUS DETECTING APPARATUS, AND METHOD OF PREDICTION FOR THE SAME

(71) Applicant: CANON KABUSHIKI KAISHA, Tokyo (JP)

(72) Inventor: Takayuki Akaguma, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/271,827

(22) Filed: Sep. 21, 2016

(65) Prior Publication Data

US 2017/0094151 A1    Mar. 30, 2017

(30) Foreign Application Priority Data

Sep. 28, 2015 (JP) ................ 2015-190068

(51) Int. Cl.
| | |
|---|---|
| *G03B 13/00* | (2006.01) |
| *H04N 5/232* | (2006.01) |
| *H04N 5/225* | (2006.01) |
| *H04N 5/228* | (2006.01) |
| *G06K 9/52* | (2006.01) |
| *G06K 9/62* | (2006.01) |
| *G06K 9/66* | (2006.01) |
| *H04N 5/369* | (2011.01) |
| *H04N 9/04* | (2006.01) |

(52) U.S. Cl.
CPC ........... *H04N 5/23212* (2013.01); *G06K 9/52* (2013.01); *G06K 9/6215* (2013.01); *G06K 9/66* (2013.01); *H04N 5/23254* (2013.01); *H04N 5/3696* (2013.01); *H04N 9/045* (2013.01)

(58) Field of Classification Search
CPC ........... H04N 5/23212; H04N 5/23296; H04N 5/2352; H04N 5/23254; G03B 13/36; G03B 15/16; G06T 7/20; G06K 9/52; G06K 9/6215; G06K 9/66
See application file for complete search history.

(56) References Cited

U.S. PATENT DOCUMENTS

| | | | | |
|---|---|---|---|---|
| 5,430,287 | A * | 7/1995 | Kusaka ................... | G02B 7/28 250/201.5 |
| 9,702,692 | B2 * | 7/2017 | Berezhnyy ............ | G01B 11/24 |
| 2010/0067891 | A1 * | 3/2010 | Uenishi .................... | G02B 7/36 396/104 |
| 2013/0033638 | A1 * | 2/2013 | Hamada ............. | H04N 5/23209 348/345 |
| 2013/0308039 | A1 * | 11/2013 | Uchiyama .......... | H04N 5/23212 348/345 |

(Continued)

FOREIGN PATENT DOCUMENTS

| | | |
|---|---|---|
| JP | 2001-021794 A | 1/2001 |
| JP | 2010-025997 A | 2/2010 |
| WO | 2010/007772 A1 | 1/2010 |

*Primary Examiner* — Chia-Wei A Chen
(74) *Attorney, Agent, or Firm* — Canon USA Inc., IP Division

(57) ABSTRACT

A CPU detects an image displacement amount using a signal acquired from an image sensor and converts a defocus amount using a conversion factor. The CPU predicts a future image-plane position of a moving object based on data on the defocus amount, time and a lens position. The CPU corrects the conversion factor using the data. The CPU predicts the future image-plane position of the moving object using the corrected conversion factor.

11 Claims, 15 Drawing Sheets

(56) References Cited

U.S. PATENT DOCUMENTS

| | | | | |
|---|---|---|---|---|
| 2014/0099090 A1* | 4/2014 | Nguyen | ............. | H04N 5/23212 396/102 |
| 2014/0300722 A1* | 10/2014 | Garcia | ................... | G01B 11/02 348/77 |
| 2014/0362276 A1* | 12/2014 | Hirose | ............... | H04N 5/23212 348/349 |
| 2015/0002703 A1* | 1/2015 | Curti | .................... | G02B 13/009 348/240.99 |
| 2015/0176976 A1* | 6/2015 | Nobayashi | ......... | H04N 5/23212 348/135 |
| 2015/0241756 A1* | 8/2015 | Uchiyama | .............. | G03B 13/36 348/347 |
| 2016/0212324 A1* | 7/2016 | Endo | ........................ | G02B 7/28 |
| 2016/0227104 A1* | 8/2016 | Guan | ................. | H04N 5/23216 |
| 2016/0239974 A1* | 8/2016 | Wang | ....................... | G01C 3/32 |
| 2016/0295099 A1* | 10/2016 | Kasamatsu | ............. | H02P 25/06 |
| 2016/0360110 A1* | 12/2016 | Kimura | .............. | H04N 5/23254 |
| 2017/0237895 A1* | 8/2017 | Sakurabu | ........... | H04N 5/23212 348/353 |
| 2017/0244889 A1* | 8/2017 | Sakurabu | ........... | H04N 5/23212 |

\* cited by examiner

FOCUS DETECTING APPARATUS, AND METHOD OF PREDICTION FOR THE SAME

BACKGROUND OF THE INVENTION

Field of the Invention

The present disclosure relates to focus detecting apparatuses, and in particular, to a focus detecting apparatus that predicts the motion of a moving object.

Description of the Related Art

Many predicting units for predicting the motion of a moving object have recently been proposed. For example, Japanese Patent Laid-Open No. 2001-21794 discloses a focusing apparatus that stores a plurality of past focus detection results and selects the most suitable function for predicting a change in a future object image-plane position from the results.

It is known in the art that a conversion factor for converting the amount of image displacement (the amount of displacement of two image signals having a parallax) detected in what-is-called imaging-plane phase-difference detection AF (autofocusing using signals acquired by an image sensor) to a defocus amount can have an error. An error in the defocus amount due to the error in the conversion factor causes defocusing. Japanese Patent Laid-Open No. 2010-025997 discloses a technique for correcting the conversion factor by comparing a conversion factor based on the result of the nth focus detection (detection of a defocus amount) and a conversion factor based on the result of the (n–1)th focus detection and assigning a weight.

In predicting the motion of a moving object in imaging-plane phase-difference detection AF, an error in the conversion factor due to vignetting would decrease the prediction accuracy of the motion of the object as compared with a case in which no error occurs. In this case, even if the correction of the conversion factor disclosed in Japanese Patent Laid-Open No. 2010-025997 is applied to a moving object to predict the motion of the object in the optical axis direction, it is sometimes difficult to accurately predict the motion of the object.

SUMMARY OF THE INVENTION

One aspect of the present disclosure is directed to providing a focus detecting apparatus capable of accurately detecting the motion of a moving object.

Another aspect of the present disclosure is directed to providing a method of prediction in such a focus detecting apparatus and a program and a storage medium for the same.

The present disclosure provides a focus detecting apparatus that predicts a future image-plane position of a moving object, a method of prediction, and a program and a storage medium for the same. The apparatus includes an image-displacement-amount detecting unit, a converting unit, a position acquiring unit, a storage unit, a predicting unit, and a correcting unit. The image-displacement-amount detecting unit detects an image displacement amount between a pair of image signals acquired from an image sensor. The converting unit converts the image displacement amount detected by the image-displacement-amount detecting unit to a defocus amount using a conversion factor. The position acquiring unit acquires information on a lens position. The storage unit stores data on the defocus amount, the lens position, and time. The predicting unit predicts the future image-plane position of the moving object using a plurality of the data stored in the storage unit. The correcting unit corrects the conversion factor using the plurality of data on the image-plane position information relating to the moving object. The predicting unit predicts the future image-plane position of the moving object based on the defocus amount converted by the converting unit using the conversion factor corrected by the correcting unit.

Further features of the present invention will become apparent from the following description of exemplary embodiments with reference to the attached drawings.

DESCRIPTION OF THE EMBODIMENTS

First Embodiment

A first embodiment of the present disclosure will be described hereinbelow with reference to accompanying drawings.

Imaging System

Figure 1:
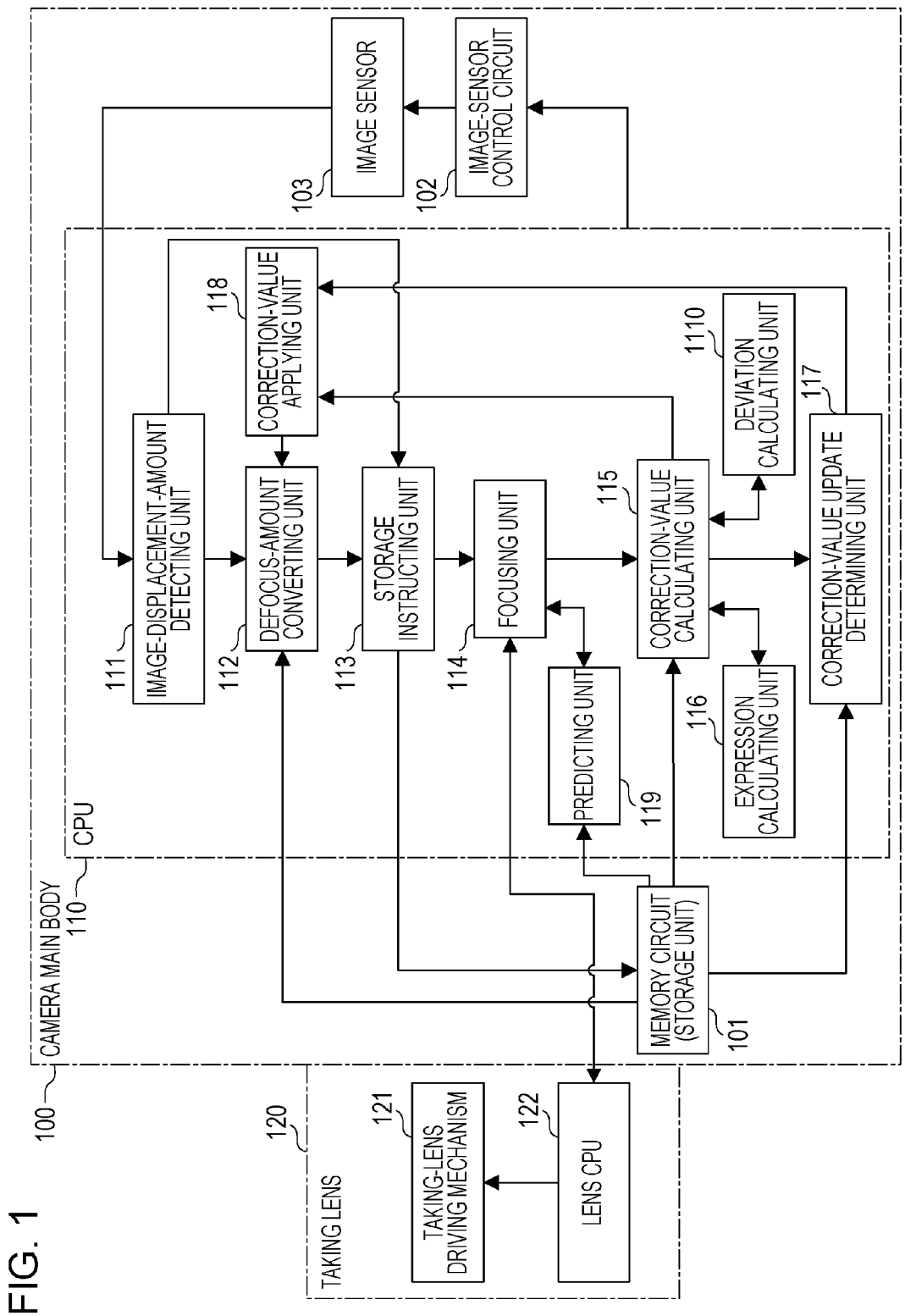
FIG. 1 is a functional block diagram of a camera main body and a taking lens according to an embodiment of the present disclosure.
Figure 2:
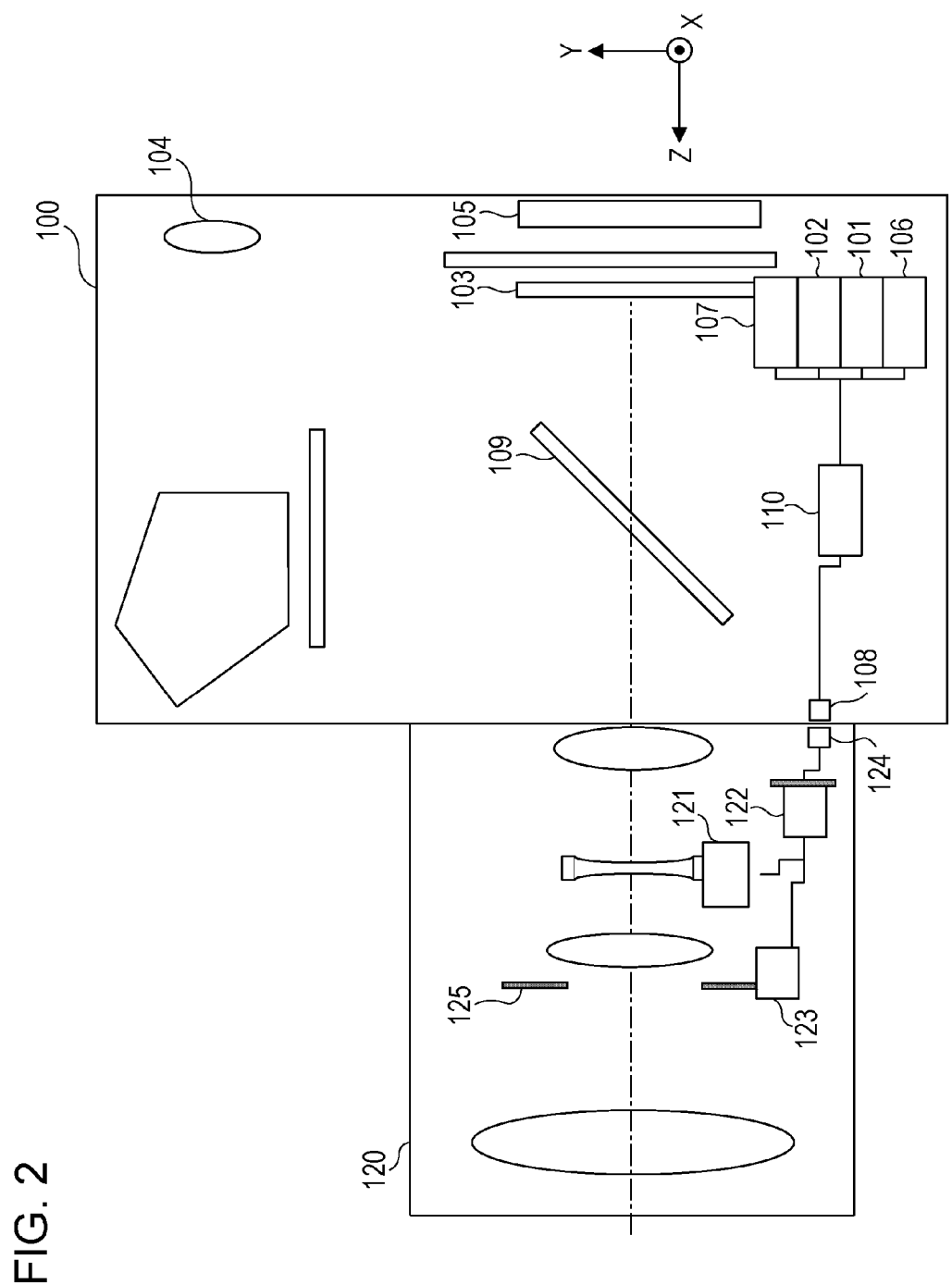
FIG. 2 is a cross-sectional view of the camera main body and the taking lens shown in FIG. 1.

Referring to FIGS. 1 and 2, a camera main body 100 and a taking lens 120 detachable from the camera main body 100 according to the first embodiment will be described. FIG. 1 is a functional block diagram of the camera main body 100 and the taking lens 120. FIG. 2 is a cross-sectional view of the camera main body 100 and the taking lens 120.

The camera of this embodiment is a lens-interchangeable digital still camera in which the camera main body 100 including a finder 104 and an image sensor 103 and the taking lens 120 including an imaging optical system are combined for use.

The camera main body 100 includes the finder 104, an image sensor 103, a display 105, a CPU 110, an image-sensor control circuit 102, a memory circuit 101, an interface circuit 106, an image processing unit 107, an electrical contact 108, and a quick-return mirror 109.

The finder 104 is disposed on the +Y side of the camera main body 100 to allow the operator to observe an object image reflected by the quick-return mirror 109.

The image sensor 103 is, for example, a complementary metal oxide semiconductor (CMOS) image sensor or a charge-coupled device (CCD) image sensor and is disposed on a predetermined imaging plane of the taking lens 120 of the camera main body 100. The details of the image sensor 103 will be described later.

The display 105 is, for example, a liquid crystal display (LCD) panel and displays photographed images and photographic information. In a live view mode, the display 105 displays a moving image of a site to be photographed in real time. The live view mode is a mode in which an object image coming from the taking lens 120 is imaged by the image sensor 103 and is displayed as a preview low-pixel moving image on the display 105 in real time. In the live view mode, phase-difference focus detection (to be described later) can be performed using image signals acquired from the image sensor 103. In a continuous photographing mode, low-pixel still images taken by continuous photographing are displayed on the display 105.

The CPU 110 integrally controls the entire camera. For example, the CPU 110 serves as an image-displacement-amount detecting unit 111, a converting unit 112, a storage instructing unit 113, a focusing unit 114, a predicting unit 119, a correction-value calculating unit 115, an expression calculating unit 116, a deviation calculating unit 1110, a correction-value update determining unit 117, and a correction-value applying unit 118.

The image-displacement-amount detecting unit 111 detects the amount of image displacement between a pair of image signals having a parallax acquired from the image sensor 103.

The converting unit 112 converts the amount of image displacement detected by the image-displacement-amount detecting unit 111 to a defocus amount using a conversion factor, described later.

The storage instructing unit 113 instructs the memory circuit 101 (a storage unit) to store the defocus amount converted by the converting unit 112 using the conversion factor, the image-plane position of the taking lens 120, the time the defocus amount is calculated, the converted defocus amount, and an object image-plane position calculated from the image-plane position of the taking lens 120. In this embodiment, the time the defocus amount is calculated is stored in the memory circuit 101. In some embodiments, not the time the defocus amount is calculated but the time the amount of image displacement is detected or the time the object image-plane position is calculated is stored for use.

In this embodiment, the image-plane position is the position of the focus of the taking lens 120 (also referred to as the image-plane position of the taking lens 120 or a lens image-plane position). The object image-plane position is the position of the focus when the taking lens 201 is at a position at which the object is focused.

The defocus amount, the image-plane position of the taking lens 120, and the object image-plane position that the storage instructing unit 113 instructs the memory circuit 101 to store may be converted in terms of image plane or lens position. In other words, any information corresponding to the defocus amount, the image-plane position of the taking lens 120, and the object image-plane position may be stored and in any unit. The information on the defocus amount, the image-plane position of the taking lens 120, and the object image-plane position may be stored in each of a plurality of units.

The focusing unit 114 instructs a lens CPU 122 to move the focal position on the basis of the converted defocus amount. Furthermore, the focusing unit 114 predicts a future object image-plane position using the predicting unit 119, calculates a lens driving amount necessary for moving the taking lens 120 to the predicted object image-plane position, and instructs the lens CPU 122 to move the taking lens 120.

The correction-value calculating unit 115 calculates a correction value for the conversion factor on the basis of plurality of data on the image-plane position information relating to the moving object.

When the correction-value calculating unit 115 calculates the correction value, the expression calculating unit 116 calculates an approximate expression for approximating the locus of the object image-plane position.

The deviation calculating unit 1110 calculates the deviation between the approximate expression calculated by the expression calculating unit 116 and the object image-plane position.

The correction-value update determining unit 117 determines whether to update the resultant correction value on the basis of the resultant correction value calculated by the correction-value calculating unit 115 and the results stored in the memory circuit 101 by the storage instructing unit 113.

When the correction-value update determining unit determines to update the correction value, the correction-value applying unit 118 corrects a conversion factor to be used by the converting unit 112 using the correction value calculated by the correction-value calculating unit 115.

The image-sensor control circuit 102 controls the operation of the image sensor 103 according to an instruction from the CPU 110.

The memory circuit 101 stores images acquired by the image sensor 103. The memory circuit 101 stores the distribution of light received by the image sensor 103 and a conversion factor, to be described later.

The interface circuit 106 outputs an image processed by the image processing unit 107 to the outside of the camera.

The image processing unit 107 processes the image signals acquired by the image sensor 103 into an image.

The electrical contact 108 is in contact with an electrical contact 124 of the taking lens 120 and is used for sending power and various signals.

The quick-return mirror 109 reflects an imaging light beam from the taking lens 120 toward the finder 104. In photographing and in a live view mode, the quick-return mirror 109 moves in the +Y direction to allow the imaging light beam from the taking lens 120 to reach the image sensor 103. A shutter (not shown) is provided on the −Z side of the quick-return mirror 109 and on the +Z side of the image sensor 103. The shutter is opened in photographing and in the live view mode.

The taking lens 120 is detachable from the camera main body 100.

The taking lens 120 includes an imaging optical system, the lens CPU 122, a taking-lens driving mechanism 121, a diaphragm driving mechanism 123, a diaphragm 125, and an electrical contact 124.

The imaging optical system is used to form an optical image of the photographed object on the image sensor 103. The imaging optical system includes a plurality of lenses and is driven by the taking-lens driving mechanism 121 to move a focal position in the vicinity of the imaging plane of the image sensor 103 in the Z-direction.

The lens CPU 122 receives focusing information sent from the CPU 110 of the camera main body 100 via the electrical contact 124 and drives the taking-lens driving mechanism 121 on the basis of the focusing information.

The diaphragm driving mechanism 123 includes a mechanism for driving the diaphragm 125 and its actuator and drives the diaphragm 125 according to an instruction from the lens CPU 122.

Structure of Image Sensor

Figure 3:
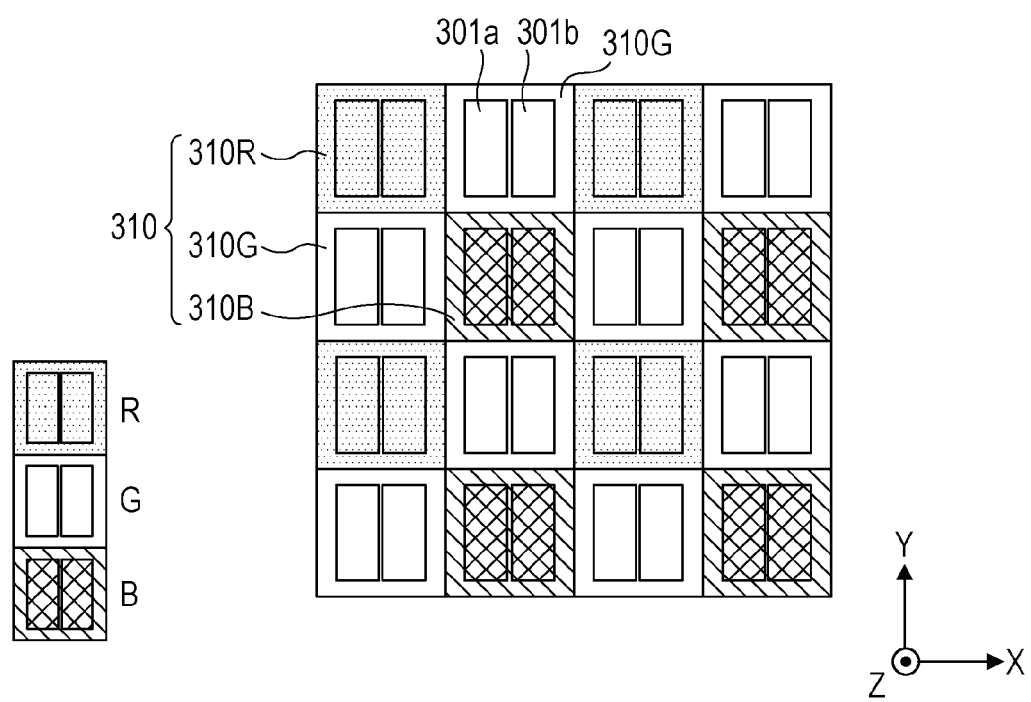
FIG. 3 is a diagram illustrating the pixel array of an image sensor according to an embodiment of the present disclosure.

Referring next to FIG. 3, the pixel structure of the image sensor 103 according to the embodiment will be described. FIG. 3 is a diagram illustrating the pixel array of the image sensor 103. With respect to the coordinate axes indicated by X, Y, and Z, the X-Y plane is positioned in the plane of FIG. 3, and the Z-axis is perpendicular to the plane.

FIG. 3 illustrates the pixel array of the image sensor 103 (a two-dimensional CMOS sensor) in a 4×4 pixel range. Each pixel unit includes a color filter 303 (see FIG. 4). The color filters 303 are arranged in a what-is-called Bayer array. A pixel unit group 310 includes two diagonal pixel unit 310G having green (G) spectral sensitivity. The pixel unit group 310 further includes a pixel unit 310R having red (R) spectral sensitivity and a pixel group 310B having blue (B) spectral sensitivity.

Concept of Pupil Dividing Function of Image Sensor

Figure 4:
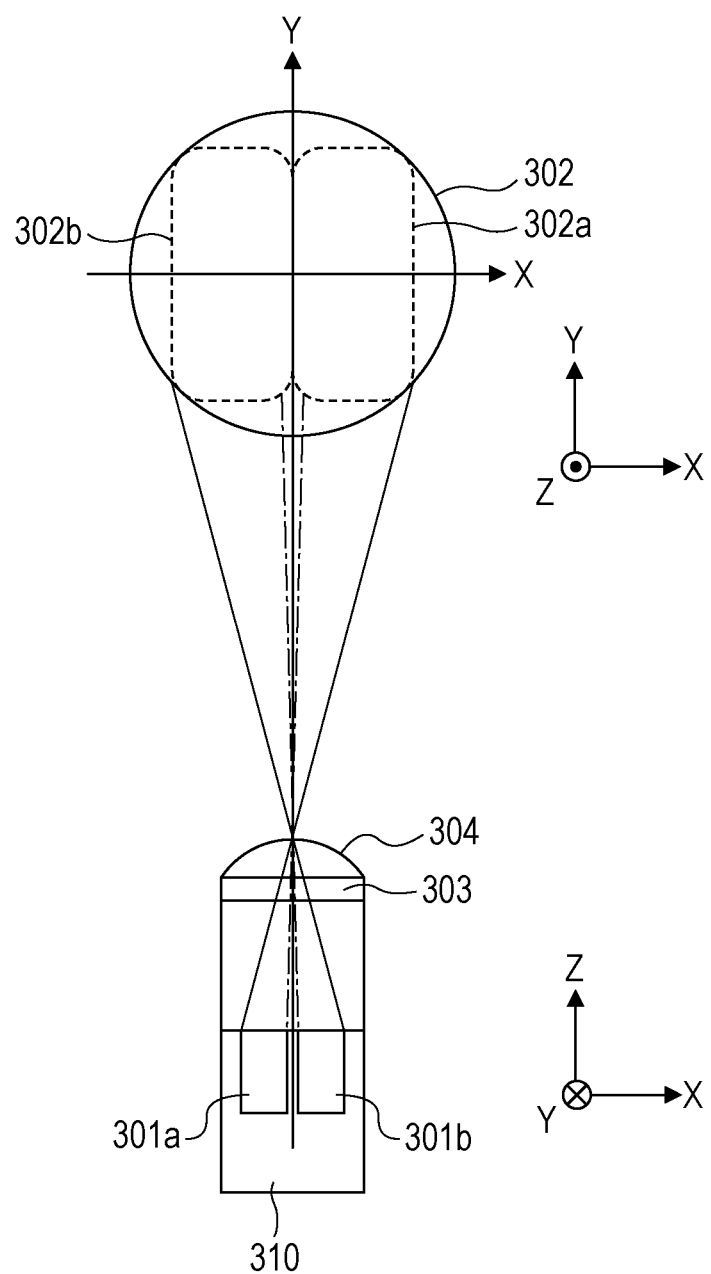
FIG. 4 is a diagram illustrating the pupil dividing function of a pixel unit of the image sensor.

Next, the pupil dividing function of the image sensor 103 will be described. FIG. 4 illustrates how the pupil is divided by the pixel unit 310 of the image sensor 103.

For the coordinate axes (X, Y, Z) shown at the upper part in FIG. 4, the X-Y plane is positioned in the plane of FIG. 4, and the Z-axis is perpendicular to the plane. With respect to the coordinate axes (X, Y, Z) of the pixel unit 310 illustrated at the lower part of FIG. 4, the X-Z plane is positioned in the plane of FIG. 4, and the Y-axis is perpendicular to the plane.

The pixel unit 310 includes a photoelectric converter 301a and a photoelectric converter 301b. Each pixel unit 310 further includes a microlens 304.

An exit pupil 302 in FIG. 4 is an image of the aperture viewed from the image sensor 103. In other words, a light beam that is left without being vignetted by the aperture frame or the lens frame passes through the exit pupil 302.

Pupil division can be performed using one microlens 304 because the photoelectric converter 301a and the photoelectric converter 301b are respectively biased in the +X-direction and the −X-direction.

FIG. 4 illustrates a pupil 302a (a region corresponding to an image signal A) and a pupil 302b (a region corresponding to an image signal B) of the exit pupil 302. The photoelectric converter 301a biased in the −X-direction (to the left in the plane of the drawing) receives a light beam that has passed through the pupil 302a and photoelectrically converts the light beam to acquire the image signal A (a first image signal). The photoelectric converter 301b biased in the +X-direction (to the right in the plane of the drawing) receives a light beam that has passed through the pupil 302b and photoelectrically converts the light beam to acquire the image signal B (a second image signal).

As described above, in this embodiment, the image signal A (the first signal) is acquired from the photoelectric converter 301a of each of the plurality of pixel units 310 shown in FIG. 3, and the image signal B (the second signal) is acquired from the photoelectric converter 301b of each of the plurality of pixel units 310 shown in FIG. 3. In other words, the image signal A is an image signal acquired from a light beam that has passed through one of a pair of regions of the exit pupil 302, and the image signal B is an image signal acquired from a light beam that has passed through the other of the regions of the exit pupil 302. The image signal A and the image signal B have parallax therebetween.

The CPU 110 (the image-displacement-amount detecting unit 111 and the converting unit 112) detects the amount of relative displacement of the image signal A acquired from the photoelectric converter 301a and the image signal B acquired from the photoelectric converter 301b and calculates a defocus amount (a what-is-called phase-difference system).

Separately using the image signal A acquired from the photoelectric converter 301a and the image signal B acquired from the photoelectric converter 301b, as described above, allows the image signals A and B to be used to detect the amount of image displacement. Adding the image signal A acquired from the photoelectric converter 301a and the image signal B acquired from the photoelectric converter 301b allows the image signals A and B to be used as recording image signals.

This embodiment is an example in which two photoelectric converters and two corresponding pupil regions are divided in the X-direction. In some embodiments, they are divided in the Y-direction.

The distance between the center of gravity of the pupil 302a and the center of gravity of the pupil 302b is a base length (not shown). The base length depends on the aperture value of the diaphragm 125. This is because a change in aperture value changes the size of the exit pupil 302, and therefore changes the sizes of the pupil 302a and the pupil 302b and their centers of gravity.

Vignetting Due to Diaphragm 125 and Asymmetry of Line Image

Referring next to FIGS. 5A to 5C, FIGS. 6A to 6C, and FIGS. 7A to 7C, pupil intensity distributions corresponding to the image signal A and the image signal B and line images acquired in correspondence with the pupil intensity distributions will be described. The sizes of a frame 503 (an aperture frame) in FIGS. 6A to 6C and a frame 603 (an aperture frame) in FIGS. 7A to 7C correspond to the size of the exit pupil 302.

Figure 5A:
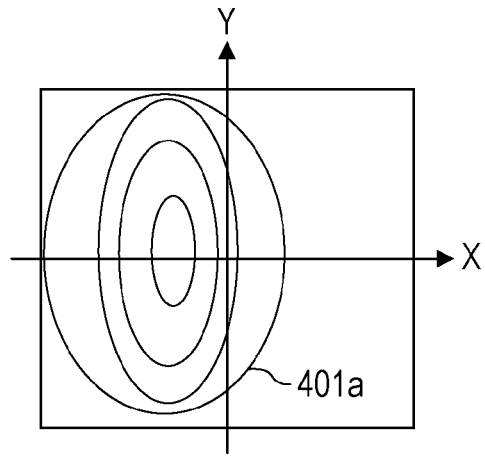
FIG. 5A is a diagram illustrating a pupil intensity distribution in which a diaphragm is not taken into account.
Figure 5B:
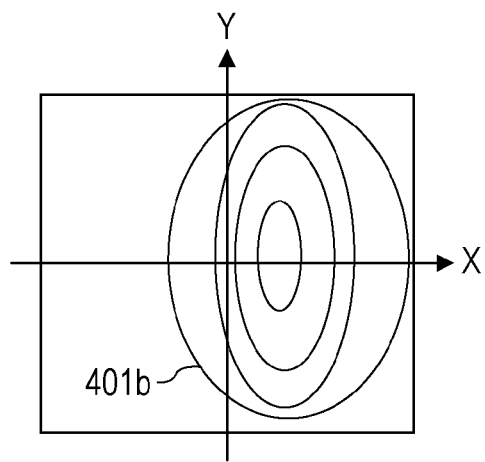
FIG. 5B is a diagram illustrating a pupil intensity distribution in which the diaphragm is not taken into account.
Figure 5C:
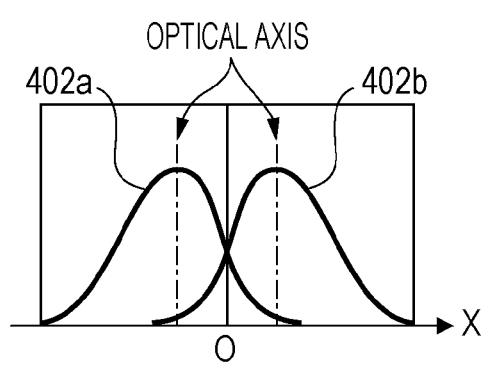
FIG. 5C is a diagram illustrating line images of the pupil intensity distributions in FIGS. 5A and 5B.

FIGS. 5A and 5B are diagrams illustrating pupil intensity distributions, and FIG. 5C is a diagram illustrating line images thereof in which the diaphragm 125 is not taken into account. FIG. 5A illustrates a pupil intensity distribution 401a corresponding to the image signal A (an image A), and FIG. 5B illustrates a pupil intensity distribution 401b corresponding to the image signal B (an image B). FIG. 5C is a cross-sectional view (line images 402a and 402b) taken along the X-axis of the pupil intensity distributions 401a and 401b corresponding to the image signal A and the image signal B, shown in FIG. 5A and FIG. 5B, respectively.

Figure 6A:
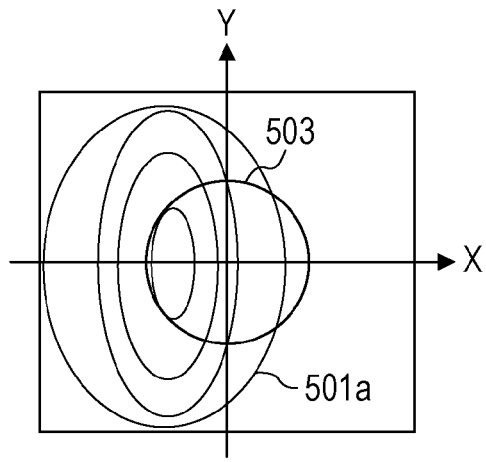
FIG. 6A is a diagram illustrating a pupil intensity distributions in the case where the aperture value is small.
Figure 6B:
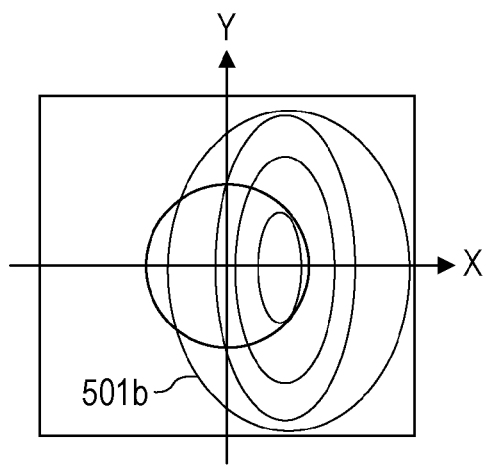
FIG. 6B is a diagram illustrating a pupil intensity distributions in the case where the aperture value is small.
Figure 6C:
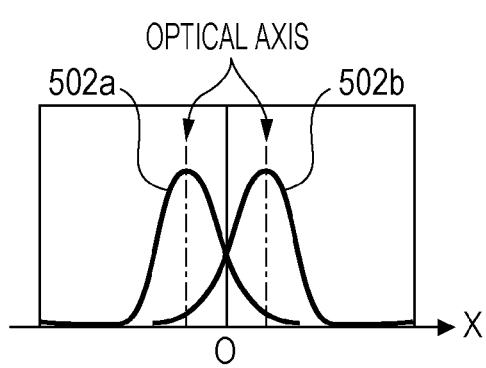
FIG. 6C is a diagram illustrating line images of the pupil intensity distributions in FIGS. 6A and 6B.

FIGS. 6A and 6B and FIG. 6C are diagrams respectively illustrating pupil intensity distributions and line images in the case where the aperture value is small (the aperture of the diaphragm 125 is large). FIG. 6A illustrates a state in which the pupil intensity distribution corresponding to the image signal A is vignetted by the frame 503 of the diaphragm 125 (an aperture frame) (a pupil intensity distribution 501a). FIG. 6B illustrates a state in which the pupil intensity distribution corresponding to the image signal B is vignetted by the frame 503 of the diaphragm 125 (a pupil intensity distribution 501b). FIG. 6C illustrates a cross-sectional view (line images 502a and 502b) taken along the X-axis of the pupil intensity distributions 501a and 501b corresponding to the image signal A and the image signal B, shown in FIG. 6A and FIG. 6B, respectively.

As shown by a comparison between FIG. 5C and FIG. 6C, the line image 502a when the aperture value is small forms a steeper curve on the −X side than the curve when the diaphragm 125 is not taken into account because of a significant influence of vignetting due to the frame 503. In contrast, the line image 502a forms a shallow curve on the +X side because of a small influence of the frame 503. Thus, with a small aperture value, the line image 502a is asymmetrical about the optical axis. The line image 502b is also asymmetrical as the line image 502a is, except that the line image 502a is reversed in positive and negative signs.

Figure 7A:
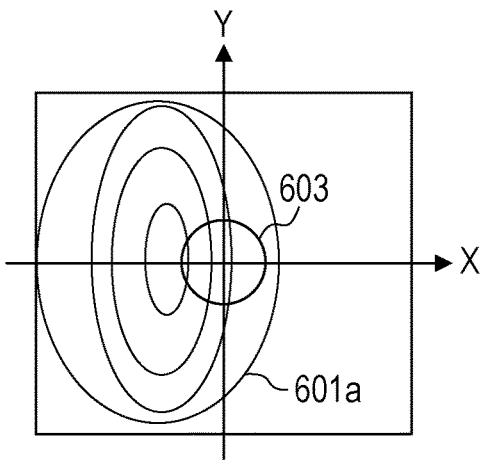
FIG. 7A is a diagram illustrating a pupil intensity distributions in the case where the aperture value is large.
Figure 7B:
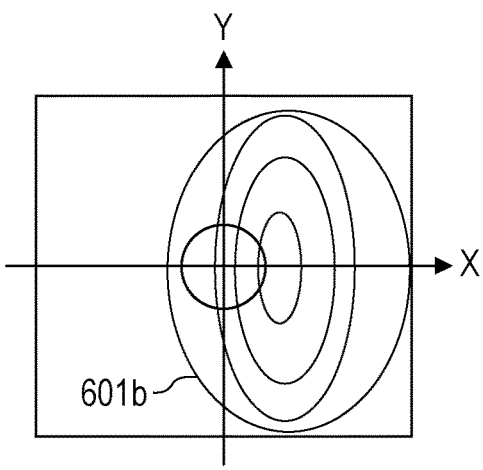
FIG. 7B is a diagram illustrating a pupil intensity distributions in the case where the aperture value is large.
Figure 7C:
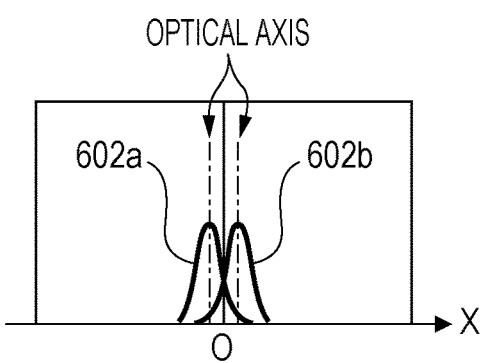
FIG. 7C is a diagram illustrating line images of the pupil intensity distributions in FIGS. 7A and 7B.

FIGS. 7A and 7B and FIG. 7C are diagrams respectively illustrating pupil intensity distributions and line images in the case where the aperture value is large (the aperture of the diaphragm 125 is small). FIG. 7A illustrates a state in which the pupil intensity distribution corresponding to the image signal A is vignetted by the frame 603 of the diaphragm 125 (an aperture frame) (a pupil intensity distribution 601a). FIG. 7B illustrates a state in which the pupil intensity distribution corresponding to the image signal B is vignetted by the frame 603 of the diaphragm 125 (a pupil intensity distribution 601b). FIG. 7C illustrates a cross-sectional view (line images 602a and 602b) taken along the X-axis of the pupil intensity distributions 601a and 601b corresponding to the image signal A and the image signal B, shown in FIG. 7A and FIG. 7B, respectively.

As shown in FIG. 7C, when the aperture value is larger than that in FIGS. 7A to 7C, the line image 602a forms a steeper curve both on the −X side and the +X side because of a significant influence of vignetting due to the frame 603. Thus, with a large aperture value, the line image 602a is symmetrical about the optical axis. The line image 602b is also symmetrical.

When the line image is symmetrical as in FIG. 7C, the image signals A and B output from the image sensor 103 have substantially the same waveform even for different objects. For this reason, an actual defocus amount and a calculated defocus amount (calculated from the detection amount of image displacement and the conversion factor) are close to each other. In contrast, when the line image is asymmetrical, as shown in FIG. 6C, the image signals A and B output from the image sensor 103 are also asymmetrical, so that the error of the calculated defocus amount relative to the actual defocus amount is larger than that when the line image is symmetrical.

Difference in Degree of Vignetting Due to Difference in Lens Position

Vignetting is caused by another factor, in addition to the diaphragm 125. As described above, this embodiment assumes that a moving object is photographed while the motion of the object is being predicted. To follow the object, the taking lens 120 moves according to the prediction of the motion of the object. As the taking lens 120 moves, the degree of vignetting also changes. This is because the size of the exit pupil 302 changes depending on the position of the taking lens 120. The difference in the size of the exit pupil 302 can cause the image signals A and B output from the image sensor 103 to be asymmetrical, as in the case described with reference to FIGS. 6A to 6C. The asymmetrical shape of the image signals A and B causes an error in the calculated defocus amount relative to an actual defocus amount, as compared with a symmetrical shape.

A method of correcting the conversion factor in view of the defocus amount, as disclosed in Japanese Patent Laid-Open No. 2010-025997, may not well able to correct vignetting caused by the difference in the position of the taking lens 120. This is because the defocus amount calculated for a moving object would not be always constant because of the motion of the object.

For this reason, this embodiment corrects the conversion factor in consideration of the position of the taking lens 120 (a lens position) to accurately predict the motion of a moving object. The details of the method will be described later.

Effects and Significance of Correction of Conversion Factor Against Vignetting

As described above, in focus detection using a pupil division method (phase-difference system), the vignetting due to the frame of the diaphragm 125 and the lens frame can cause deformation of the line image into an asymmetrical shape. This causes a difference between an actual defocus amount and a calculated defocus amount. In other words, an error has occurred between the ideal conversion factor and the conversion factor actually used. To accurately calculate the defocus amount, a more suitable conversion factor needs to be used.

In this embodiment, in predicting the motion of a moving object, an error in the calculated defocus amount relative to the actual defocus amount is decreased by suitably correcting a conversion factor for converting an image disposition amount to a defocus amount. This allows more accurate focusing on the object.

In particular, in predicting the motion of a moving object, this embodiment allows more accurate prediction of the motion of the object by correcting an error in the conversion factor due to vignetting caused by a difference in lens position.

Preparation for Photographing in Servo Photographing Mode and Photographing Process Subsequently, a method for calculating a correction value for a conversion factor and a method for applying the calculated correction value according to the embodiment will be described with reference to FIGS. 8 to 13.

Figure 8:
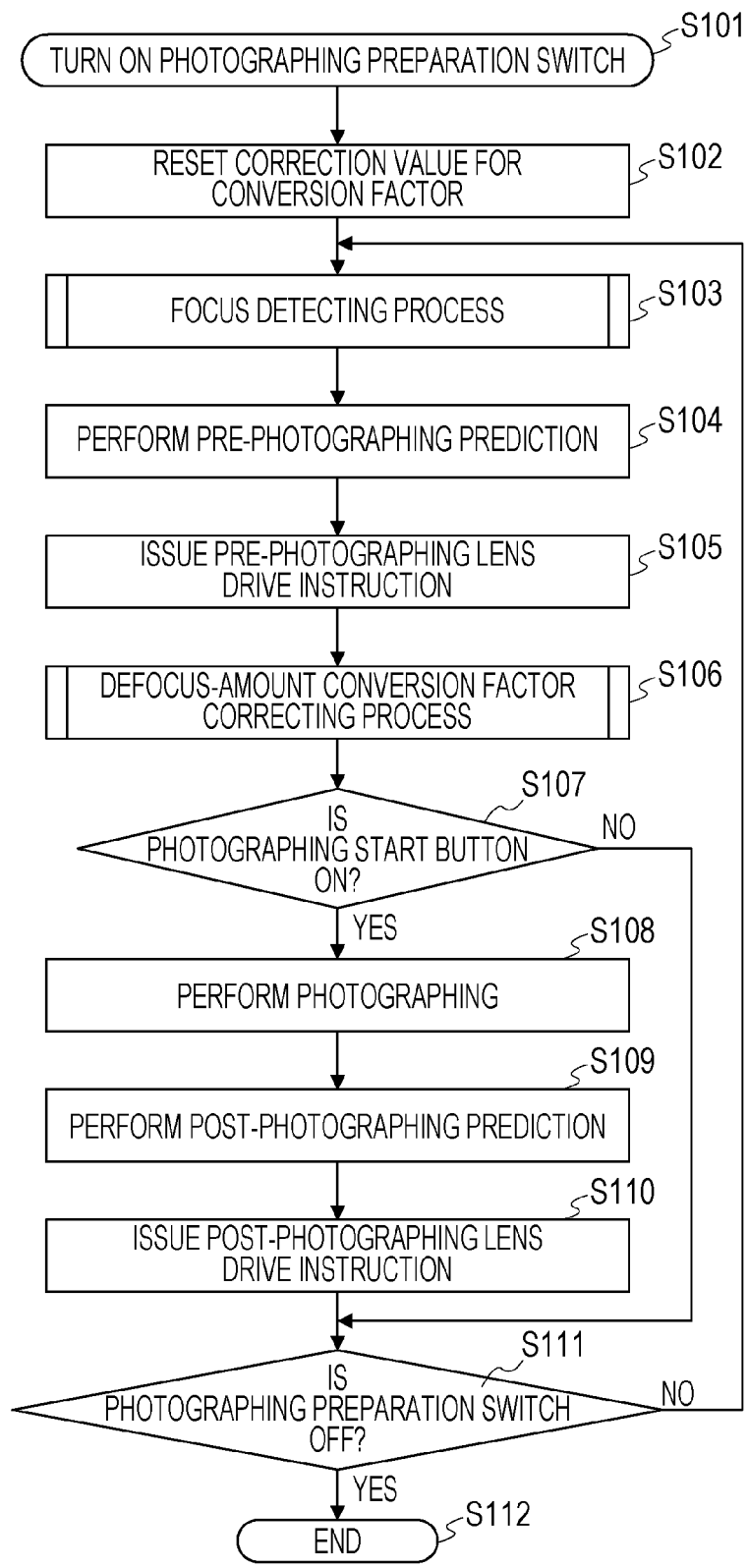
FIG. 8 is a flowchart in a servo photographing mode.

Referring first to FIG. 8, the operation of the camera of this embodiment during the servo photographing mode in a state in which a photographing preparation switch (SW1) is ON (for general cameras, a photographing button is half-pressed) will be described. The servo photographing mode is a mode for driving the taking lens 120 while a future object image-plane position is being predicted. When the photographing preparation switch is turned on in the servo photographing mode, the process in FIG. 8 is started.

Preparation for Photographing

When the photographing preparation switch is turned on in the servo photographing mode, then at step S102, the CPU 110 resets the correction value for the conversion factor. This is for the purpose of preventing the conversion factor used when the photographing preparation switch was turned on before the photographing preparation switch is turned on from being used in the next photographing. In the reset of the conversion-factor correction value at step S102, the correction value is reset to an initial value 1 on the assumption that there is no difference between a set conversion factor (a conversion factor set in advance on the basis of an aperture value, for example) and an ideal conversion factor.

Next at step S103, the CPU 110 performs a focus detection process. The details will be described later with reference to FIG. 9.

At step S104, the CPU 110 (the predicting unit 119) performs pre-photographing prediction. In the pre-photographing prediction, when the photographing start switch is ON (a SW2 is ON, and the photographing button is full-pressed), the CPU 110 predicts an image-plane position for the period from the time the amount of image displacement is detected to the time imaging using the image sensor 103 is performed. When the photographing start switch is OFF, the CPU 110 predicts an image-plane position for the period until the next detection of the amount of image displacement.

At step S105, the CPU 110 calculates a lens driving amount necessary for moving the taking lens to the image-plane position predicted at step S104 and sends the driving amount to the lens CPU 122.

At step S106, the CPU 110 performs a conversion-factor correcting process. The details will be described later with reference to FIG. 11.

Next at step S107, the CPU 110 determines the state of the photographing start switch. If the switch is ON, the process goes to photographing at step S108. If the switch is OFF, the process goes to step S111.

Photographing

At step S108, the CPU 110 instructs the image-sensor control circuit 102 to drive the image sensor 103 and stores a record image acquired by the image sensor 103 in the memory circuit 101 (the storage unit).

At step S109, the CPU 110 (the predicting unit 119) performs post-photographing prediction. The CPU 110 predicts an image-plane position for the period until the next image displacement amount detection (step S103).

At step S110, the CPU 110 calculates a lens driving amount necessary for moving the taking lens 120 to the image-plane position predicted at step S109 and sends the driving amount to the lens CPU 122.

At step S111, the CPU 110 determines whether the photographing preparation switch is OFF. If the switch is OFF, the process goes to step S112 and terminates the photographing and the preparation for photographing. If the switch is ON, the process returns to step S103 and repeats steps S103 to S111 until the photographing preparation switch is turned OFF.

Focus Detecting Process

Figure 9:
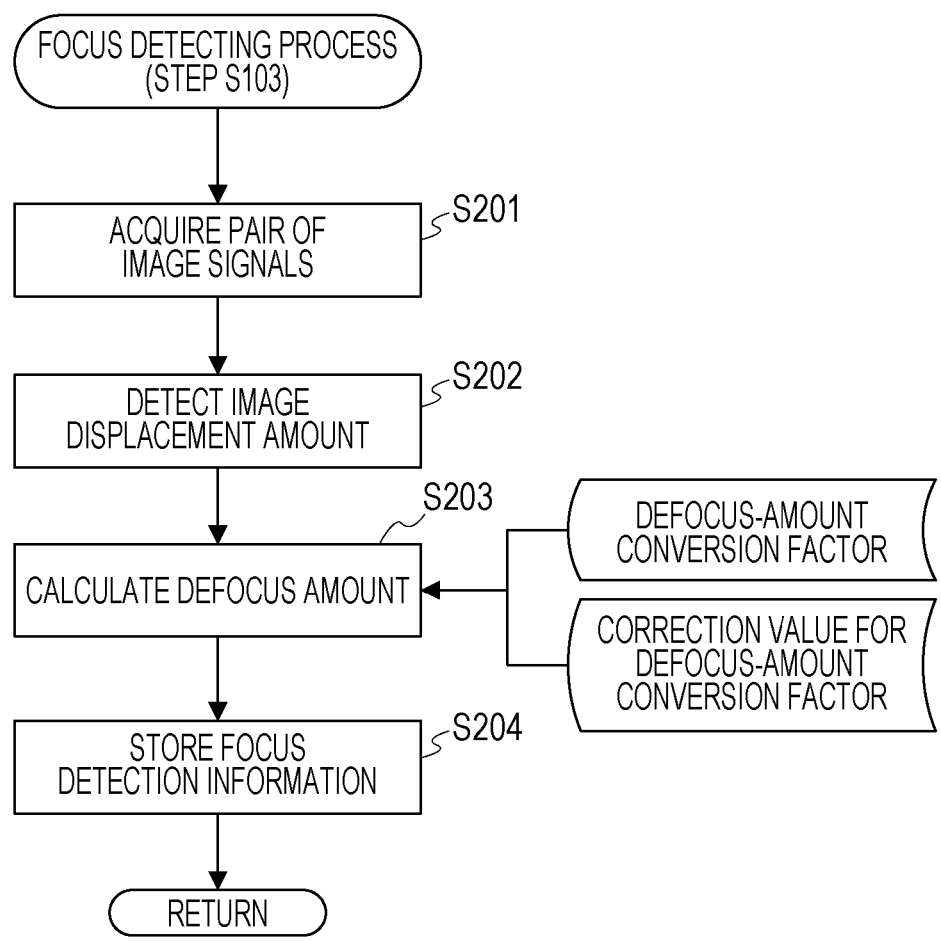
FIG. 9 is a flowchart for a focus detecting process.
Figure 10:
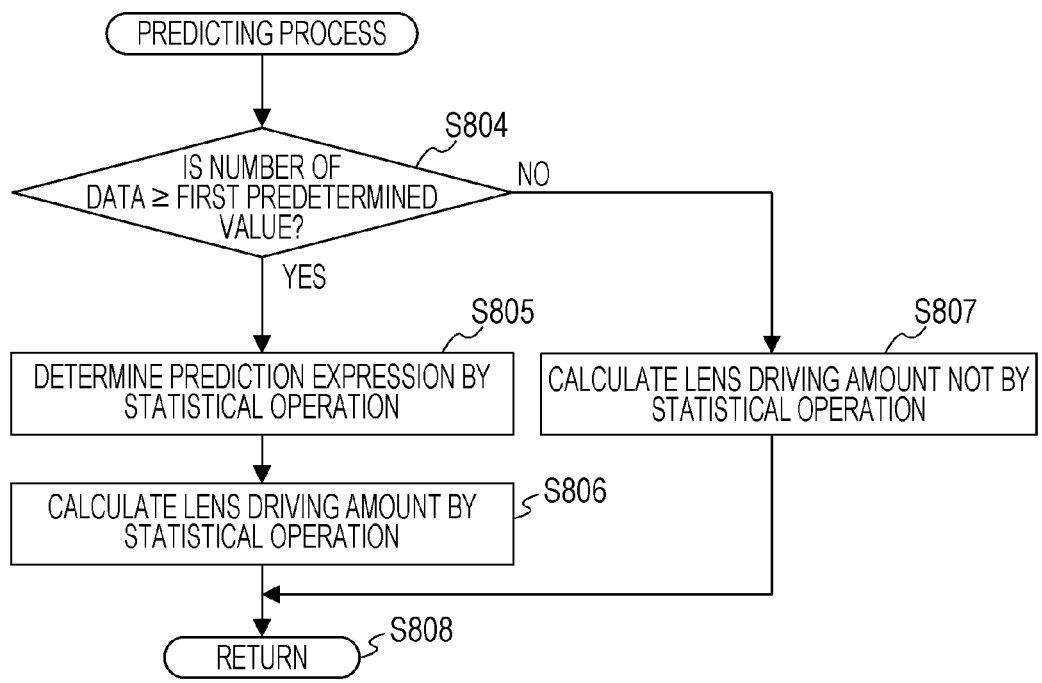
FIG. 10 is a flowchart for a predicting process.

Next, an example of the operation of the focus detecting process at step S103 will be described with reference to the flowchart in FIG. 9. Specifically, the focus detection in this embodiment is to calculate a defocus amount on the basis of the amount of image displacement. The details will be described hereinbelow.

At step S201, the CPU 110 acquires the image signal A and the image signal B output from the image sensor 103.

At step S202, the CPU 110 (the image-displacement-amount detecting unit 111) detects an image displacement amount using the image signal A and the image signal B acquired at step S201.

Next at step S203, the CPU 110 (the converting unit 112) converts the image displacement amount calculated at step S202 to a defocus amount. For the first defocus-amount calculating process after the photographing preparation switch is turned on, the conversion factor is a set conversion factor (a conversion factor preset on the basis of an aperture value or the like). For the second and the subsequent defocus-amount calculating processes after the photographing preparation switch is turned on, if the conversion factor corrected by the conversion-factor correcting process at step S106 has been updated, a conversion factor corrected by the CPU 110 (a correcting unit) is used. In this case, the conversion factor is a value obtained by correcting the conversion factor stored in the external data (in the memory circuit 101). The conversion factor in the external data is stored in advance in the memory circuit 101 (the storage unit).

At step S204, the defocus amount calculated at step S203 is stored as focus detection information in the memory circuit 101 (the storage unit). The memory circuit 101 further stores the image-plane position of the taking lens 120 at the time the defocus amount is calculated, the object image-plane position calculated on the basis of the defocus amount and the lens position information, and the defocus-amount calculation time (hereinafter simply referred to as calculation time). In general, a certain amount of charge accumulation time is needed to acquire image signals from the image sensor 103. For this reason, an intermediate point between the accumulation start time and the end time is set as a defocus-amount calculation time, and the defocus amount is added to the relative extension amount of the taking lens 120 to calculate the object image-plane position. Instead of the defocus amount calculation time, the image-displacement-amount detection time or the object-image-plane-position calculation time may be stored in the memory circuit 101 for use, as described above. The image-plane position of the taking lens 120 at the defocus-amount calculation time is acquired from the lens CPU 122 by the CPU 110 (a position acquiring unit).

The information stored in the memory circuit 101 is used for the conversion-factor correcting process (step S106), the pre-photographing prediction process (step S104), and the post-photographing prediction process (step S109). The details will be described later.

Predicting Process

Next, a predicting process for predicting a future image-plane position from a plurality of past object image-plane positions and a change in defocus-amount calculation time will be described. The predicting process is applied to the pre-photographing predicting process at step S104 and the post-photographing predicting process at step S109.

A detailed description of the method for predicting a future image-plane position will be omitted because it is described in Japanese Patent Laid-Open No. 2001-21794. In the first embodiment, prediction is performed using statistical operation, which is one of the embodiments of Japanese Patent Laid-Open No. 2001-21794, with reference to the flowchart in FIG. 10.

First at step S804, the CPU 110 determines whether the number of data (the defocus-amount calculation times and the object image-plane positions) stored in the memory circuit 101 is greater than or equal to a first predetermined number. This is because if the number of data is less than the first predetermined number, the statistical operation cannot be performed. If it is determined that the number of data is greater than or equal to the first predetermined number, the process goes to step 805, and a prediction expression is determined using the statistical operation. If the number of data is less than the first predetermined number, the process goes to step S807.

The determination of the prediction expression using the statistical operation at step S805 will be briefly described because it is described in detail in Japanese Patent Laid-Open No. 2001-21794. In a prediction function f(t), as expressed as Exp. (1), functions α, β, and γ are statistically determined by multiple regression analysis.

$$f(t)=\alpha+\beta t+\gamma t^n \quad \text{Exp. (1)}$$

where n is a value at which an error of prediction for a plurality of typical moving object photographing scenes is the minimum.

After the prediction expression is determined at step S805, then at step S806, the CPU 110 (the predicting unit 119) predicts a future object image-plane position using the data stored in the memory circuit 101 (the defocus-amount calculation times and the object image-plane positions). The CPU 110 calculates a lens driving amount necessary for moving the taking lens 120 to the object image-plane position. For the pre-photographing prediction at step S104, when the photographing start switch (SW2) is ON, and when the photographing button is full-pressed, the CPU 110 predicts an object image-plane position for the period until photographing, as described above. When the photographing start switch is OFF, the CPU 110 predicts an object image-plane position for the period until the next image displacement amount detection. For the post-photographing prediction at step S109, the CPU 110 predicts an object image-plane position for the period until the next image displacement amount detection (step S103), as described above.

In contrast, if at step 804 the CPU 110 determines that the number of data is less than the first predetermined number, then the process goes to step S807, at which the CPU 110 calculates a lens driving amount not by statistical operation but on the basis of the calculated defocus amount.

Error of Defocus Amount when Conversion Factor has Error Influence on in-Focus Accuracy when Difference Between Actual Defocus Amount and Calculated Defocus Amount is Large Problems when the error of a calculated defocus amount relative to an actual defocus amount is large will be described hereinbelow.

First, the defocus amount is obtained by Exp. (2).

$$(\text{Defocus amount})=K\times(\text{Image displacement amount}) \quad \text{Exp. (2)}$$

where K is a conversion factor.

As is evident from the definition of Exp. (2), when the defocus conversion factor has an error, compared with a correct conversion factor, the calculated defocus amount also has an error. In other words, a correct defocus amount until an in-focus state is achieved cannot be calculated.

Figure 15A:
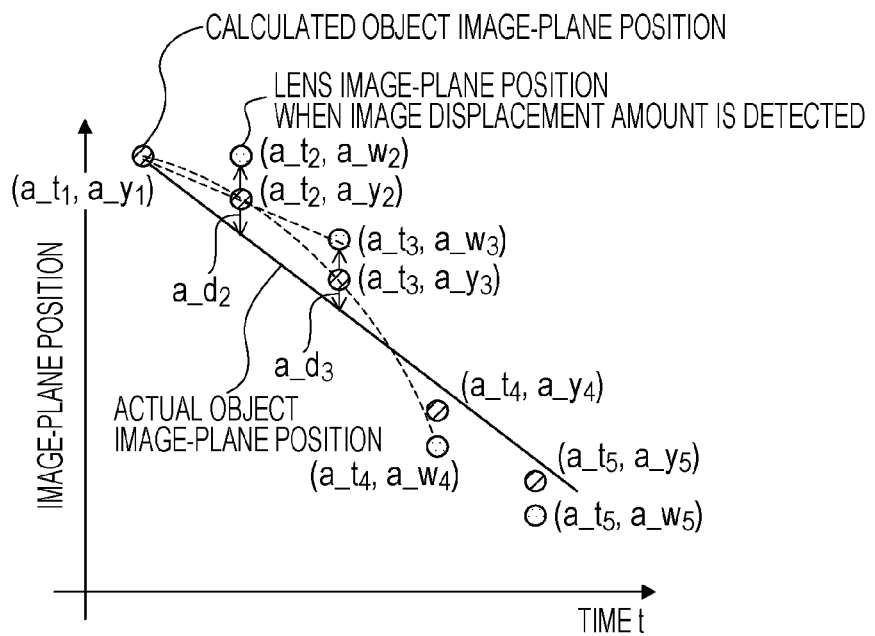
FIG. 15A is a diagram illustrating an influence on prediction.
Figure 15B:
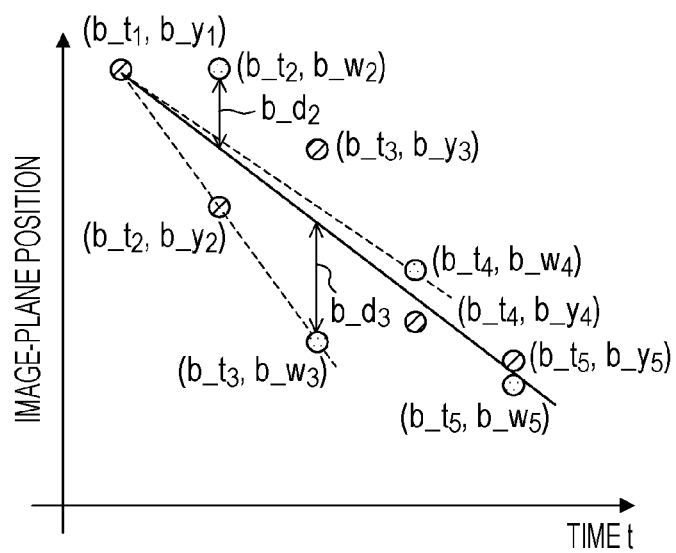
FIG. 15B is a diagram illustrating an influence on prediction.

Next, FIGS. 15A and 15B illustrate what influence is exerted on the result of prediction on a moving object when a correct defocus amount until an in-focus state is achieved cannot be calculated. FIG. 15A illustrates an influence on prediction when a conversion-factor error amplification $K_r$ is less than 1 (when the set conversion factor is less than a proper conversion factor). FIG. 15B illustrates an influence on prediction when the conversion-factor error amplification $K_r$ is greater than 1 (when the set conversion factor is greater than the proper conversion factor). The conversion-factor error amplification $K_r$ is defined by Exp. (3).

$$K_r=(\text{Set conversion factor})/(\text{Ideal conversion factor}) \quad \text{Exp. (3)}$$

In other words, when the conversion-factor error amplification $K_r$ is equal to 1, the ideal conversion factor (proper conversion factor) and the set conversion factor agree with each other.

In FIG. 15A, the vertical axis indicates the image-plane position, and the horizontal axis indicates the time the image displacement amount is detected. Assume that the object image-plane position shifts linearly and that an object image-plane position $a\_y_1$ calculated at the first image displacement amount detection $a\_t_1$ is calculated without error relative to the actual object image-plane position. At the second image displacement amount detection $a\_t_2$, the difference between the lens image-plane position $a\_w_2$ at the image displacement amount detection and the object image-plane position is the actual defocus amount $a\_d_2$. However, with a conversion-factor error amplification of less than 1, the calculated defocus amount is smaller than the actual defocus amount, causing an error in the calculated object image-plane position $a\_y_2$ relative to the actual object image-plane position. This causes the focal position to be located at the back of the in-focus position. Next at the third image displacement amount detection $a\_t_3$, the lens image-plane position is $a\_w_3$ because the focusing unit 114 has shifted the lens image-plane position at the image displacement amount detection in advance using the predicting unit 119. The difference between the lens image-plane position $a\_w_3$ at the image displacement amount detection and the object image-plane position is the actual defocus amount $a\_d_3$. Since the conversion-factor error amplification is less than 1 as well, the calculated defocus amount is smaller than the actual defocus amount, which causes an error in the calculated object image-plane position $a\_y_3$ relative to the actual object image-plane position, causing the focal position to be located at the back of the in-focus position. Repeating the above operation causes errors in the calculated object image-plane positions such as to move between positions beyond the actual object image-plane positions and positions short of the actual object image-plane position, as indicated by $a\_y_n$ in FIG. 15A, where n is a natural number.

FIG. 15B illustrates a case in which the conversion-factor error amplification $K_r$ is greater than 1. As in FIG. 15A, the vertical axis indicates the image-plane position, and the horizontal axis indicates the time the image displacement amount is detected. The object image-plane position shifts linearly, and the object image-plane position $b\_y_1$ calculated at the first image displacement amount detection $b\_t_1$ is calculated without an error relative to the proper object image-plane position. At the second image displacement amount detection $b\_t_2$, the difference between the lens image-plane position $b\_w_2$ at the image displacement amount detection and the object image-plane position is the actual defocus amount $b\_d_2$. At that time, when the conversion-factor error amplification is greater than 1, the calculated defocus amount is larger than the actual defocus amount, and the calculated object image-plane position $b\_y_2$ has an error relative to the actual object image-plane position, causing the focal position to be located short of the in-focus position. Next at the third image displacement amount detection $b\_t_3$, the lens image-plane position is $b\_w_3$ because the focusing unit 114 has shifted the lens image-plane position at the image displacement amount detection in advance using the predicting unit 119. At that time, the difference between the lens image-plane position $b\_w_3$ at the image displacement amount detection and the object image-plane position is the actual defocus amount $b\_d_3$. Since the conversion-factor error amplification is greater than 1, the calculated defocus amount is larger than the actual defocus amount, which causes an error in the calculated object image-plane position $b\_y_3$ relative to the actual object image-plane position, causing the focal position to be located in front of the in-focus position.

Repeating the above operation causes errors in the calculated object image-plane positions such as to move between positions beyond the actual object image-plane positions and positions short of the actual object image-plane position, as indicated by b_$y_n$ in FIG. 15B.

When an error occurs between the set conversion factor and the ideal conversion factor to cause a difference between the actual defocus amount and the calculated defocus amount, the prediction accuracy of the predicting process on the actual motion of the object is reduced, as described above.

To cope with this, the embodiment of the present disclosure reduces the error in the calculated defocus amount relative the actual defocus amount by correcting the conversion factor. This improves the accuracy of the predicting process on the moving object.

Correcting Process

Figure 11:
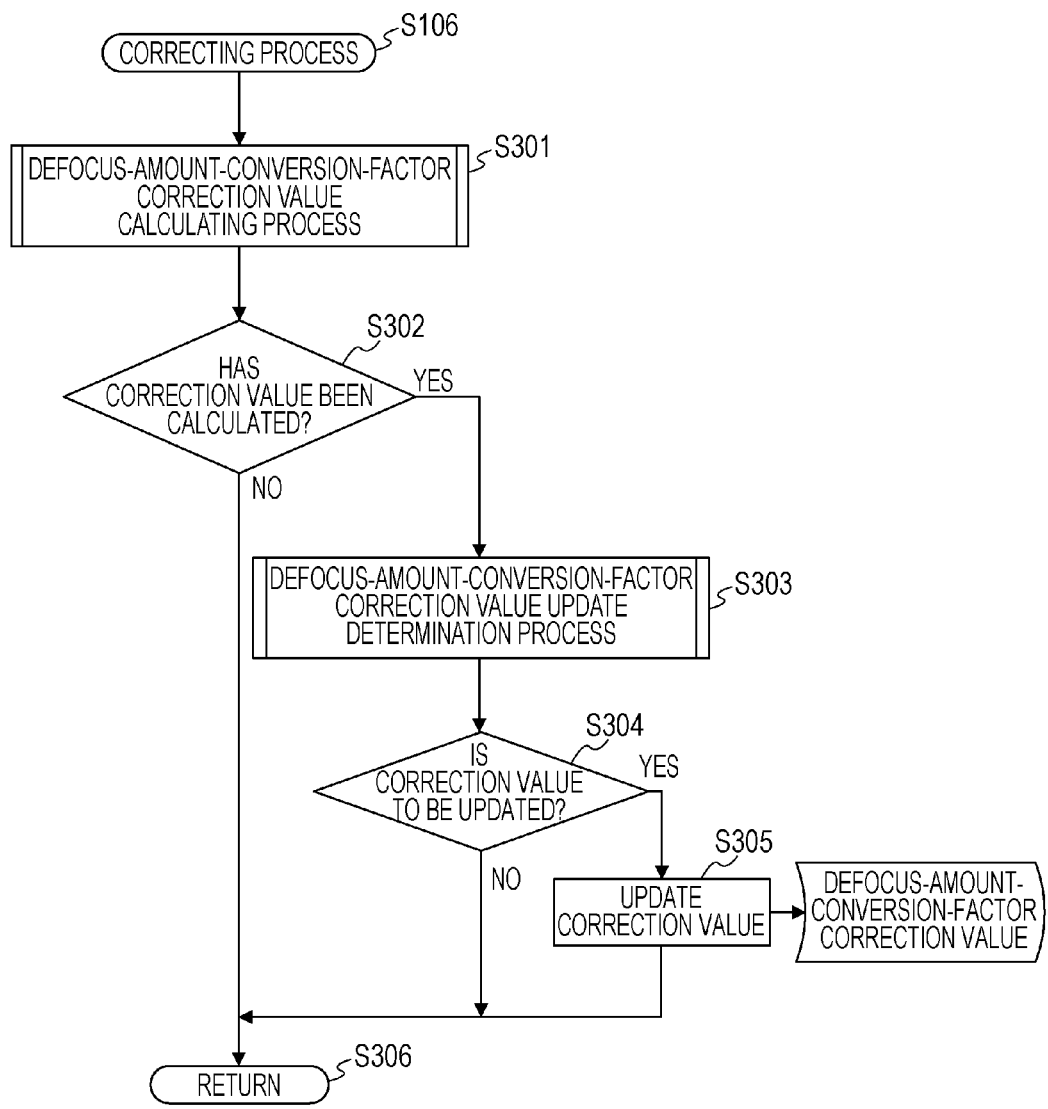
FIG. 11 is a flowchart for a conversion-factor correcting process.
Figure 12:
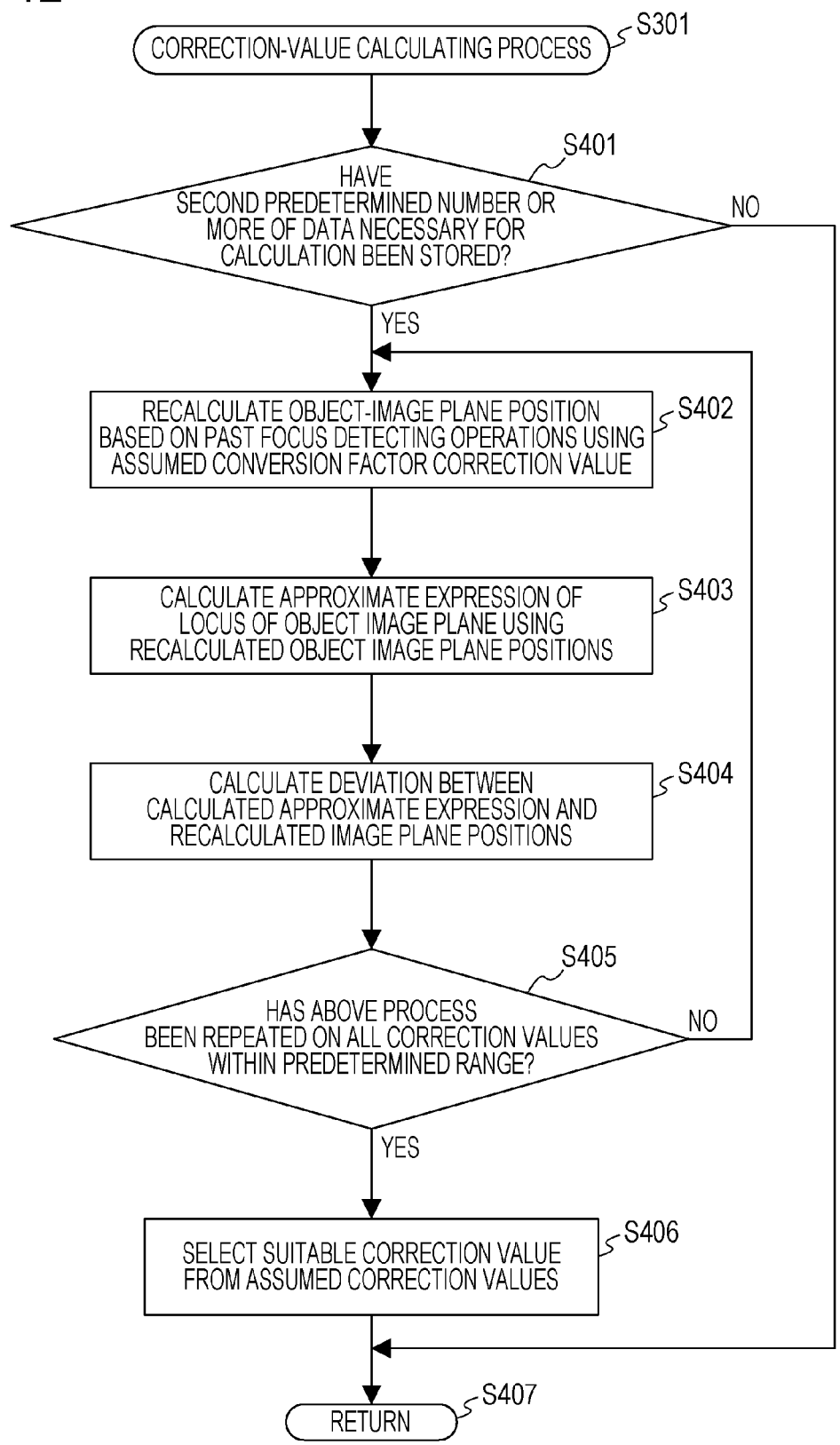
FIG. 12 is a flowchart for a conversion-factor-correction-value calculating process.
Figure 13:
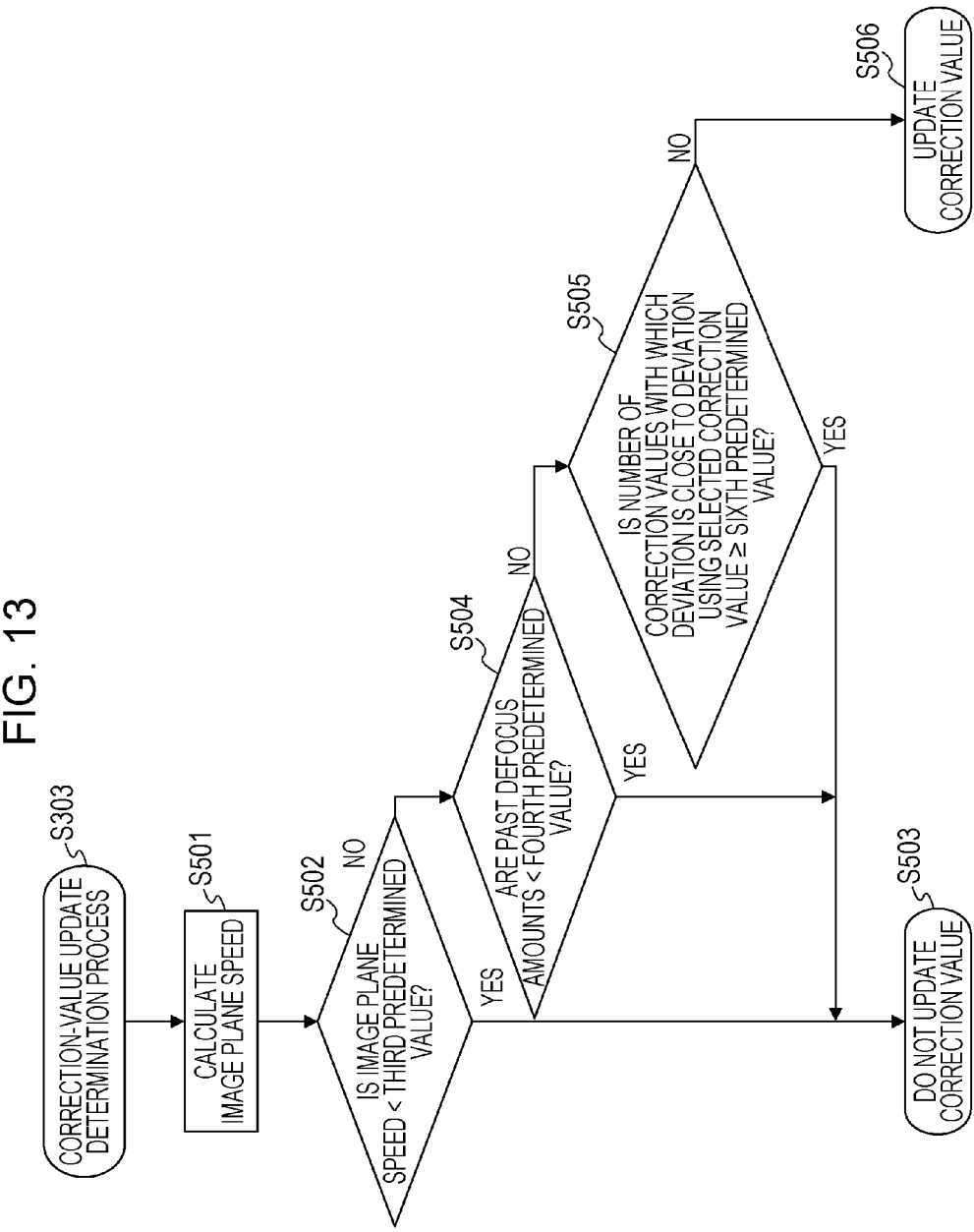
FIG. 13 is a flowchart for a conversion-factor-correction-value update determination process.

Correction of the conversion factor will be described hereinbelow with reference to FIGS. 11 to 13.

First, an example of the operation for correcting the conversion factor will be described with reference to the flowchart in FIG. 11.

At step S301, the CPU 110 calculates a correction value for the conversion factor. The details of the correction-value calculating process will be described in detail below with reference to the sub-flowchart in FIG. 12.

At step S302, the CPU 110 determines whether a correction value for the conversion factor is calculated at step S301. If at step S301 the correction value for the conversion factor is calculated, then the process goes to step S303. If the correction value is not calculated, the process returns to the flowchart in FIG. 8, without correcting the conversion factor.

At step S303, the CPU 110 determines whether to update the correction value for the conversion factor. The details will be described later with reference to the sub-flowchart in FIG. 13.

At step S304, the CPU 110 determines whether to update the correction value on the basis of the result of the determination whether to update the correction value for the conversion factor at step S303. If the CPU 110 determines to update the correction value, the process goes to step S305. If the CPU 110 determines not to update the correction value, the process goes to step S306 and returns to the flowchart in FIG. 8 without correcting the conversion factor.

At step S305, the CPU 110 updates the correction value for the conversion factor to the latest correction value calculated at step S301. Specifically, the CPU 110 updates the conversion-factor correction value stored in the external data (in memory circuit 101) to the calculated correction value. The updated conversion-factor correction value is applied to the defocus-amount calculating process at step S203 in the focus detecting process at step S103.

Correction-Value Calculating Process (Steps S401 to S406)]

Next, an example of the operation of the process for calculating the conversion-factor correction value at step S301 will be described with reference to the flowchart in FIG. 12.

At step S401, the CPU 110 determines whether a second predetermined number or more of data necessary for calculating the conversion-factor correction value are stored in the memory circuit 101 (in other words, the number of times of focus detection is greater than or equal to a predetermined number). If the second predetermined number or more of data are stored, the process goes to step S402. If the stored data is less than the second predetermined number, the correction value is not calculated, and the process ends.

Recalculation of Object Image-Plane Position Corresponding to Assumed Correction Value (Step S402)

At step S402, the CPU 110 calculates an object image-plane position on the basis of data acquired by a plurality of past focus detecting operations (defocus amounts and lens position information on the taking lens 120 when the defocus amount is calculated) using one of a plurality of assumed conversion-factor correction values. The process at step S402 will be specifically described hereinbelow.

When the above-described conversion-factor error amplification $K_r$ and the correction value are equal to each other, an ideal conversion factor can be obtained. While the definition of the conversion-factor error amplification $K_r$ is expressed by Exp. (3), the ideal conversion factor is an unknown value, and the correction value cannot be directly obtained. To address this, a plurality of correction values for correcting the present conversion factor are assumed. Let the assumed correction values be $r_n$, where n is a natural number. The plurality of correction values $r_n$ are set in a predetermined range. The predetermined range can be freely set, and any number of assumed correction values can be set at any intervals in the predetermined range. In this embodiment, for example, 11 correction values $r_n$ are assumed at intervals of 0.1 in the range of 0.5 to 1.5 (that is, n corresponds to one of 1 to 11). At step S402, the CPU 110 (a position calculating unit) calculates an object image-plane position using the assumed correction value, as expressed by Exp. (4).

$$y(t,r_n)=d(t)/r_n+p(t) \qquad \text{Exp. (4)}$$

where t is the defocus-amount calculation time stored in the data, y is a calculated object image-plane position, d(t) is a calculated defocus amount calculated at the calculation time t, and p(t) is the image-plane position of the taking lens 120 at the calculation time t.

In Exp. (4), the calculated defocus amount d(t) is divided by the correction value $r_n$ for the conversion factor (or may be multiplied by the reciprocal of the correction value $r_n$). This is for the purpose of converting the calculated defocus amount d(t) to a defocus amount converted using a conversion factor corrected using the correction value $r_n$. The defocus amount is derived from Exp. (2).

At step S402, the CPU 110 (a position calculating unit) recalculates an object image-plane position at that time using Exp. (4) on the basis of the assumed correction value and the stored past data (that is, the past focus detection result).

Calculation of Approximate Expression and Calculation of Deviation Between Approximate Expression and Object Image-Plane Position (Steps S403 to S405)

At step S403, the CPU 110 (the expression calculating unit 116) calculates an approximate expression of the locus of the object image plane using the plurality of recalculated object image-plane positions. For the approximate expression, the CPU 110 (the predicting unit 119) statistically calculates the factors of the prediction function, which is the same as the prediction function Exp. (1) used in the above-described predicting process, using the recalculated object image-plane positions and the defocus-amount calculation time.

At step S404, the CPU 110 (the deviation calculating unit 1110) calculates the deviations between the calculated approximate expression and the individual recalculated image-plane positions. In other words, the CPU 110 quantitatively calculates the degree of fitness of the approximate expression calculated at step S403 to combinations of the plurality of recalculated object image-plane positions and the defocus-amount calculation times. In this embodiment, the dispersion of differences between the approximate expression and the plurality of recalculated object image-plane positions is obtained as a method for calculating the deviation.

At step S405, the CPU 110 determines whether the process from step S402 to step S404 has been repeated on all the assumed correction values $r_n$ in the predetermined range. For example, when the calculation of deviation at step S404 is complete for all the assumed correction values $r_n$, the process goes to step S406. If not, the process returns to step S402, and step S402 to S405 are repeated until the process at step S404 is complete on all the assumed correction values $r_n$. For example, when 11 correction values are assumed, the process from step S402 to S405 is repeated 11 times.

At step S406, the CPU 110 (a selecting unit) selects a suitable correction value from the assumed correction values $r_n$. A concept in selecting a suitable correction value will be described with reference to FIGS. 14A to 14C.

Figure 14A:
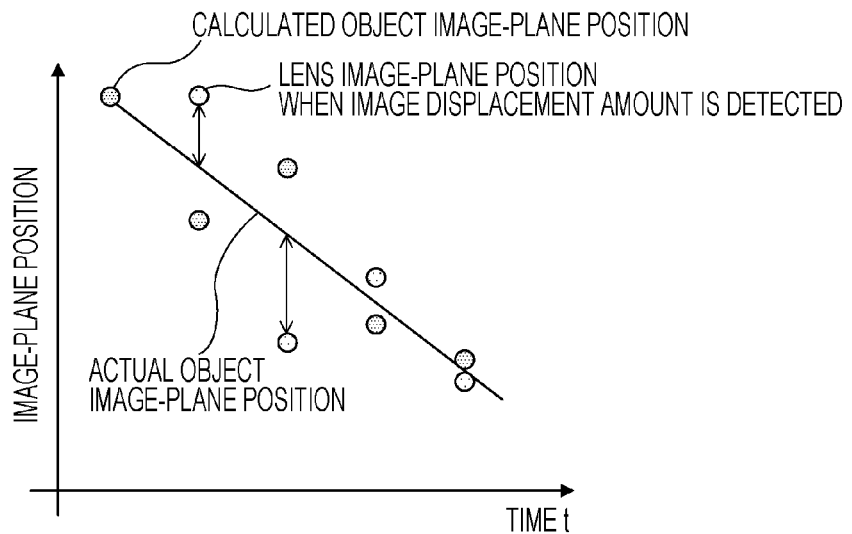
FIG. 14A is a diagram illustrating selection of a conversion-factor error amplification.
Figure 14B:
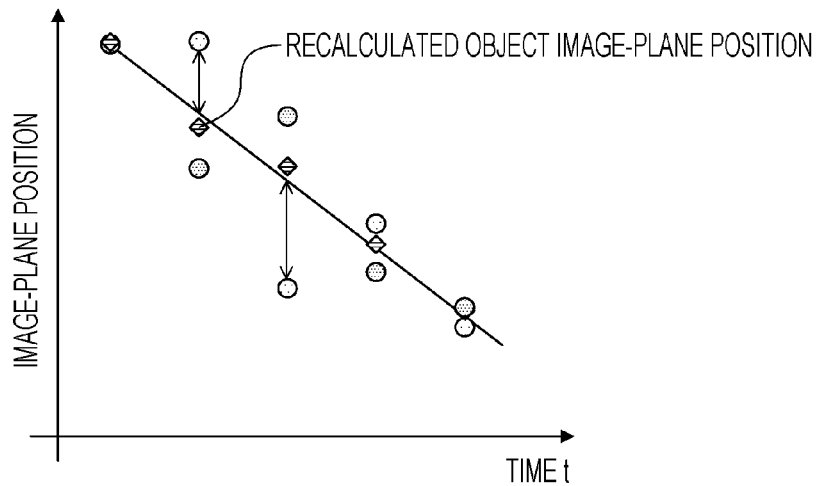
FIG. 14B is a diagram illustrating selection of a conversion-factor error amplification.
Figure 14C:
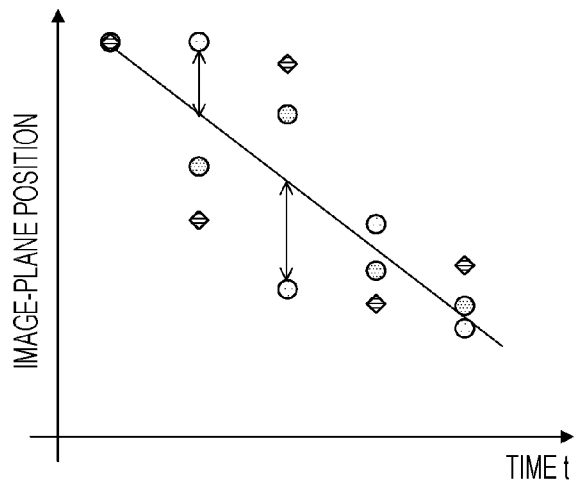
FIG. 14C is a diagram illustrating selection of a conversion-factor error amplification.

FIG. 14A illustrates object image-plane positions calculated when the conversion-factor error amplification is greater than 1, as in FIG. 15B. FIG. 14B illustrates recalculated object image-plane positions of the object image-plane positions in FIG. 14A calculated when the correction value is assumed to be greater than 1. FIG. 14C illustrates object image-plane positions of the object image-plane positions in FIG. 14A recalculated on the assumption that the correction value is less than 1. In FIG. 14B, the difference between the recalculated object image-plane positions and the actual object image-plane positions is small because the conversion-factor error amplification actually used in calculation and the assumed correction value are close to each other. In contrast, in FIG. 14C, the difference between the recalculated object image-plane positions and the actual object image-plane positions is larger than the difference of the calculated object image-plane positions because the conversion-factor error amplification that is actually used in calculation and the assumed correction value differ.

In other words, the use of the dispersion for calculating deviation allows the conversion factor to be corrected more appropriately by selecting a correction value $r_n$ assumed when the dispersion is the minimum. For the above reason, at step S406, the CPU 110 (a selecting unit) selects a correction value $r_n$ that is assumed when the dispersion is the minimum.

Correction-Value Update Determination Process

Next, an example of the operation of the conversion-factor-correction-value update determination process at step S303 will be described with reference to the flowchart in FIG. 13.

At step S501, the CPU 110 (a speed calculating unit) calculates an image plane speed. The image plane speed is the moving speed of the image-plane position. The CPU 110 calculates the image plane speed from the image-plane position obtained by the converting unit 112, the defocus-amount calculation time, and the stored plurality of past image-plane positions.

At step S502, the CPU 110 (a speed determination unit) determines whether the image plane speed calculated at step S501 is lower than a third predetermined value. If the image plane speed is lower than then the third predetermined value, the object may not have moved, and then the process goes to step S503, and the correction value is not updated. This is because the low image plane speed has little influence of the error on the calculated object image-plane position because a change in the motion of the object is smaller at the low image plane speed than at a high image plane speed.

Furthermore, the object is more likely to be at a distance at a low image plane speed than at a high image plane speed, and an error in defocus amount, if any, is unnoticeable. If the image plane speed is higher than the third predetermined value, the process goes to step S504.

At step S504, the CPU 110 (a defocus-amount determining unit) determines whether the plurality of past defocus amounts are smaller than a threshold. If the calculated defocus amounts are smaller, the influence of an error in the conversion factor, if any, on the calculated object image-plane positions is small. For this reason, if the plurality of past defocus amounts are smaller than a fourth predetermined value, the process goes to step S503, and the correction value is not updated. In contrast, if the plurality of past defocus amounts are larger than the fourth predetermined value, the process goes to step S505.

At step S505, the CPU 110 (deviation determining unit) determines whether the difference between the deviations calculated at step S404 in the conversion-factor correction value calculating process is less than a fifth predetermined value. Specifically, the CPU 110 compares a deviation calculated using the correction value selected at step S406 with deviations calculated using the other correction values. If there are a sixth predetermined number or more of correction values in which a difference in deviation is less than the fifth predetermined value, the process goes to step S503, and the correction value is not updated. If there is a small difference between the deviation calculated using the correction value selected at step S406 and the deviations using the other correction values, the correction value is not updated because the reliability of the conversion-factor correction value selected from the different deviation values is low. In contrast, if the difference between the deviations is greater than or equal to the fifth predetermined value, the process goes to step S506, and the calculated correction value is updated.

Only one of step S502 and step S504 may be performed. If the image plane speed is lower than the third predetermined value, the defocus amount may also be small, and only step S502 is performed. This further reduces the processes performed by the CPU 110.

At step S505, the CPU 110 may determine whether the difference between the deviation calculated using the correction value selected at step S406 and the largest deviation is greater than or equal to a seventh predetermined value. If the difference is less than the seventh predetermined value, the correction value is not updated.

Advantages of the Embodiment

According to the first embodiment, the conversion factor is corrected in consideration of not only the defocus amount but also the lens position. This allows the conversion factor to be corrected even if vignetting due to the optical system occurs for a moving object. For example, vignetting of the object due to a difference in lens position can be corrected. This allows the motion of the moving object to be predicted more accurately.

Since the conversion factor is corrected in consideration of the lens position, an error in the conversion factor due to the lens position (and the object distance) can be corrected.

In the correction of the conversion factor according to this embodiment, a new correction value is calculated by recalculating an object image-plane position and an approximate expression at the correction-value calculating process (step S301) every time the result of the focus detecting process (step S103) is updated. Thus, even if the past correction value is not proper, a more suitable correction value can be calculated without being influenced by the past correction value.

Other Embodiments

In the first embodiment, a correction value for the conversion factor is calculated in consideration of the lens position (and the object image-plane position). In some embodiments, other defocus conversion factors for converting the defocus amount according to conditions (an aperture value and so on) including the lens position are determined in advance.

In this case, processes for correcting the conversion factor using the CPU 110 can be significantly reduced, while the amount of information stored in the memory circuit 101 of the camera or the memory of the taking lens 120 increases.

Having described the embodiments of the present disclosure, it is to be understood that the present disclosure is not limited to the above embodiments and various modifications and changes can be made in the scope of the spirit of the present disclosure.

According to the embodiments of the present disclosure, the motion of a moving object can be accurately predicted.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-190068, filed Sep. 28, 2015, which is hereby incorporated by reference herein in its entirety.

What is claimed is:

1. A focus detecting apparatus that predicts a future image-plane position of a moving object, the apparatus comprising:

an image-displacement-amount detecting unit configured to detect an image displacement amount between a pair of image signals acquired from an image sensor;

a converting unit configured to convert the image displacement amount detected by the image-displacement-amount detecting unit to a defocus amount using a conversion factor;

a position acquiring unit configured to acquire information on a lens position;

a predicting unit configured to predict the future image-plane position of the moving object using a plurality of data on the defocus amount, the lens position, and time; and a correcting unit configured to correct the conversion factor using the plurality of data on the image-plane position information relating to the moving object, wherein the predicting unit predicts the future image-plane position of the moving object based on the defocus amount converted by the converting unit using the conversion factor corrected by the correcting unit.

2. The focus detecting apparatus according to claim 1, further comprising:

a position calculating unit configured to calculate the image-plane position of an in-focus object using the data stored in a storage unit;

an expression calculating unit configured to calculate an approximate expression using a plurality of the image-plane positions of the object calculated by the position calculating unit; and a deviation calculating unit configured to calculate deviations of the image-plane positions of object used in calculating the approximate expression from the approximate expression, wherein the position calculating unit calculates a plurality of the image-plane positions of the object in correspondence with a plurality of correction values for correction, wherein the expression calculating unit calculates a plurality of approximate expressions in correspondence with the plurality of correction values, wherein the correcting unit corrects the conversion factor using a correction value used for calculating an approximate expression in which a deviation calculated by the deviation calculating unit is small and for calculating the plurality of image-plane positions of the object, and wherein the predicting unit predicts the future image-plane position of the moving object based on the defocus amount converted by the converting unit using the conversion factor corrected by the correcting unit.

3. The focus detecting apparatus according to claim 2, wherein the correcting unit corrects the conversion factor using a correction value used for calculating an approximate expression in which a deviation calculated by the deviation calculating unit is smallest and for calculating the plurality of image-plane positions of the object.

4. The focus detecting apparatus according to claim 3, wherein the deviation calculating unit calculates, as the deviation, a degree of dispersion of the image-plane positions of the object relative to the approximate expression.

5. The focus detecting apparatus according to claim 4, wherein, when, among a plurality of correction values, there are a sixth predetermined number or more of correction values in which a difference in deviation, calculated by the deviation calculating unit, between a correction value with which the deviation is smallest and other correction values is less than a fifth predetermined value, the correcting unit does not correct the conversion factor.

6. The focus detecting apparatus according to claim 5, wherein the converting unit converts the image displacement amount detected by the image-displacement-amount detecting unit to the defocus amount,
wherein the correcting unit corrects the conversion factor using the plurality of data on the defocus amount and the time stored in the storage unit, and
wherein the converting unit calculates a defocus amount using a new conversion factor corrected by the correcting unit for an image displacement amount newly detected by the image-displacement-amount detecting unit.

7. The focus detecting apparatus according to claim 6, wherein the time comprises a time when the image-displacement-amount detecting unit detects an image displacement amount, a time when the converting unit converts the defocus amount, or a time when the position calculating unit calculates the image-plane position of the object.

8. The focus detecting apparatus according to claim 5, wherein when the defocus amount converted by the converting unit is less than a fourth predetermined value, the correcting unit does not correct the conversion factor.

9. The focus detecting apparatus according to claim 5, further comprising a speed calculating unit configured to calculate an image plane speed, wherein when the image plane speed is lower than a third predetermined value, the correcting unit does not correct the conversion factor.

10. The focus detecting apparatus according to claim 5, wherein when the data stored in the storage unit is smaller in number than a second predetermined number, the correcting unit does not correct the conversion factor.

11. A prediction method for a focus detecting apparatus that predicts a future image-plane position of a moving object, the method comprising the steps of:
   detecting an image displacement amount between a pair of image signals acquired from an image sensor;
   converting the image displacement amount detected in the image-displacement-amount detecting step to a defocus amount using a conversion factor;
   acquiring information on a lens position;
   storing a plurality of data on the defocus amount, the lens position, and time;
   predicting the future image-plane position of the moving object using the plurality of data stored in the storing step; and
   correcting the conversion factor using the plurality of data on the image-plane position information relating to the moving object,
   wherein, in the correcting step, the conversion factor is corrected using the data on the lens position stored in the storing step, and
   wherein the future image-plane position of the moving object is predicted in the predicting step based on the defocus amount converted in the converting step using the conversion factor corrected in the correcting step.

* * * * *